United States Patent
Fujishiro et al.

(10) Patent No.: US 12,200,558 B2
(45) Date of Patent: Jan. 14, 2025

(54) CELL RESELECTION CONTROL METHOD AND USER EQUIPMENT

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 616 days.

(21) Appl. No.: 17/384,141

(22) Filed: Jul. 23, 2021

(65) Prior Publication Data

US 2021/0352555 A1  Nov. 11, 2021

Related U.S. Application Data

(63) Continuation of application No. PCT/JP2020/001224, filed on Jan. 16, 2020.

(60) Provisional application No. 62/795,684, filed on Jan. 23, 2019.

(51) Int. Cl.
*H04W 36/22* (2009.01)
*H04W 36/36* (2009.01)

(52) U.S. Cl.
CPC .......... *H04W 36/22* (2013.01); *H04W 36/36* (2013.01)

(58) Field of Classification Search
CPC ..... H04W 36/22; H04W 36/36; H04W 76/27; H04W 48/18; H04W 48/00
See application file for complete search history.

(56) References Cited

U.S. PATENT DOCUMENTS

| | | | |
|---|---|---|---|
| 10,911,969 B2 | 2/2021 | Chen et al. | |
| 2015/0049662 A1* | 2/2015 | Kim | H04W 48/20 370/312 |
| 2019/0173533 A1* | 6/2019 | Kim | H04B 7/0695 |

FOREIGN PATENT DOCUMENTS

JP  2018-510527 A  4/2018

OTHER PUBLICATIONS

3rd Generation Partnership Project; Technical Specification Group Radio Access Network; NR; NR and NG-RAN Overall Description; Stage 2, V15.3.0, Sep. 2018; pp. 1-92; Valbonne, France.
Mediatek Inc., Cell Selection and Reselection in NR-U; 3GPP TSG-RAN2#104 meeting; Tdoc R2-1816481; Nov. 16, 2018; Spokane, WA, US.

* cited by examiner

*Primary Examiner* — Yaotang Wang
(74) *Attorney, Agent, or Firm* — Studebaker & Brackett PC

(57) ABSTRACT

A cell reselection control method according to one embodiment is a method performed by a user equipment in an RRC idle state or an RRC inactive state in an unlicensed band. The cell reselection control method includes determining a congestion level individually for a plurality of candidates that are a plurality of carrier frequencies belonging to the unlicensed band or a plurality of cells, extracting, from among the plurality of candidates, a candidate satisfying a selection criterion required for the candidate to be used as a serving cell of the user equipment, and selecting, from among a plurality of the extracted candidates, a cell to be used as the serving cell. At least one of the extracting a candidate or the selecting a cell is based on the congestion level determined in the determining.

8 Claims, 13 Drawing Sheets

Cell Selection Criterion

The cell selection criterion S is fulfilled when:

Srxlev > 0  AND  Squal > 0 AND Soccup < Th   ---A where:

Srxlev = $Q_{rxlevmeas} - (Q_{rxlevmin} + Q_{rxlevminoffset}) - P_{compensation} - Qoffset_{temp}$
Squal = $Q_{qualmeas} - (Q_{qualmin} + Q_{qualminoffset}) - Qoffset_{temp}$
Soccup = $(Qoccup\_max + Qoccup\_offset) - Qoccup\_meas$

FIG. 6

Intra-frequency and equal priority inter-frequency Cell Reselection criteria

The cell-ranking criterion $R_s$ for serving cell and $R_n$ for neighbouring cells is defined by:

$R_s = Q_{meas,s} + Q_{hyst} - Qoffset_{temp} - Qmeas, congestion$ $R_n = Q_{meas,n} - Qoffset - Qoffset_{temp} - Qmeas, congestion$

FIG. 7

Congestion status at UE

Introduction:
The UE congestion state is determined if the parameters (Thresh_congestion_H, Thresh_congestion_L, T_congestion) are broadcasted in system information for the serving cell.

State detection criteria:
Normal congestion state criteria: [Congestion Level] < Thresh_congestion_L
Medium congestion state criteria: Thresh_congestion_L <= [Congestion Level] < Thresh_congestion_H
High congestion state criteria: Thresh_congestion_H < [Congestion Level]
The UE is allowed skip to measure the congestion, e.g., the channel occupancy measurement or LBT check, if it's obvious because of e.g., licensed spectrum.

State transition:
The UE shall
- If the criteria for Normal/ Medium/ High congestion status is fulfilled during T_congestion,
  - Enter High/ Medium/ High congestion status respectively.
If the UE is in High- or Medium-congestion state, the UE shall apply the congestion dependent scaling rules.

Scaling rule:
The UE shall apply the following scaling rules.
- If neither Medium- nor High-congestion state is detected:
  - no scaling is applied.
- If High-congestion state or Medium-congestion state is detected:
  - Add [Scaling factor] to or multiply [Scaling factor] by Qoffset-temp (in S-criterion), Qhyst (in R-criterion) and/or Qoffset (in R-criterion), for example.
  - Multiply [Scaling factor: T_congestion] by TreselectionRAT, whereby the scaling factor should be below -1, for example.

FIG. 9

CELL RESELECTION CONTROL METHOD AND USER EQUIPMENT

RELATED APPLICATIONS

The present application is a continuation based on PCT Application No. PCT/JP2020/001224, filed on Jan. 16, 2020, which claims the benefit of U.S. Provisional Application No. 62/795,684 filed on Jan. 23, 2019. The content of which is incorporated by reference herein in their entirety.

TECHNICAL FIELD

The present disclosure relates to a cell reselection control method and a user equipment in a mobile communication system.

BACKGROUND ART

In existing Long Term Evolution (LTE) of the 3rd Generation Partnership Project (3GPP), license-assisted access (LAA) is defined that enables LTE communication using both a licensed band being a frequency band for which a license is required and an unlicensed band being a frequency band for which a license is not required. Further, an unlicensed band may be referred to as an unlicensed spectrum.

In recent years, the 3GPP has standardized New Radio (NR) which is considered a 5th-generation (5G) radio access technology. Although the current NR specification does not define a mechanism to use an unlicensed band, the 3GPP has started discussion to introduce NR-U which is a technique using an unlicensed band in NR communication.

It is assumed that, in NR-U, an unlicensed band can be used alone without using both the unlicensed band and a licensed band. Under this assumption, a new function that LAA does not have is considered to be necessary.

CITATION LIST

Non Patent Literature

NPL 1: 3GPP Technical Specification "TS38.300 V15.3.0", September 2018, Internet <URL: http://www.3gpp.org/ftp//Specs/archive/38_series/38.300/38300-f30.zip>

SUMMARY

A cell reselection control method according to one embodiment is a method performed by a user equipment in an RRC idle state or an RRC inactive state in an unlicensed band. The cell reselection control method includes the steps of determining a congestion level individually for a plurality of candidates that are a plurality of carrier frequencies belonging to the unlicensed band or a plurality of cells, extracting, from among the plurality of candidates, a candidate satisfying a selection criterion required for the candidate to be used as a serving cell of the user equipment, and selecting, from among a plurality of the extracted candidates, a cell to be used as the serving cell. At least one of the extracting a candidate or the selecting a cell is based on the congestion level determined in the determining.

The cell reselection control method according to one embodiment is a method for controlling a cell reselection process in an unlicensed band. The cell reselection control method includes receiving, by a user equipment in an RRC connected state, an RRC release message including a conditional priority for determining a priority in the cell reselection for a carrier frequency from a base station, suspending, by the user equipment that has transitioned to an RRC idle state or an RRC inactive state in accordance with the reception of the RRC release message, application of the conditional priority until a predetermined condition for a current serving cell is satisfied, instead of immediately applying the conditional priority, and applying, by the user equipment in the RRC idle state or the RRC inactive state, the conditional priority if the predetermined condition is satisfied.

BRIEF DESCRIPTION OF DRAWINGS

FIG. 6 is a diagram indicating a specific example of a selection criterion according to a first embodiment.

FIG. 7 is a diagram indicating a specific example of a ranking criterion according to the first embodiment.

FIG. 9 is a diagram indicating a cell reselection control method according to a modified example of the first embodiment.

DESCRIPTION OF EMBODIMENTS

Figure 1:
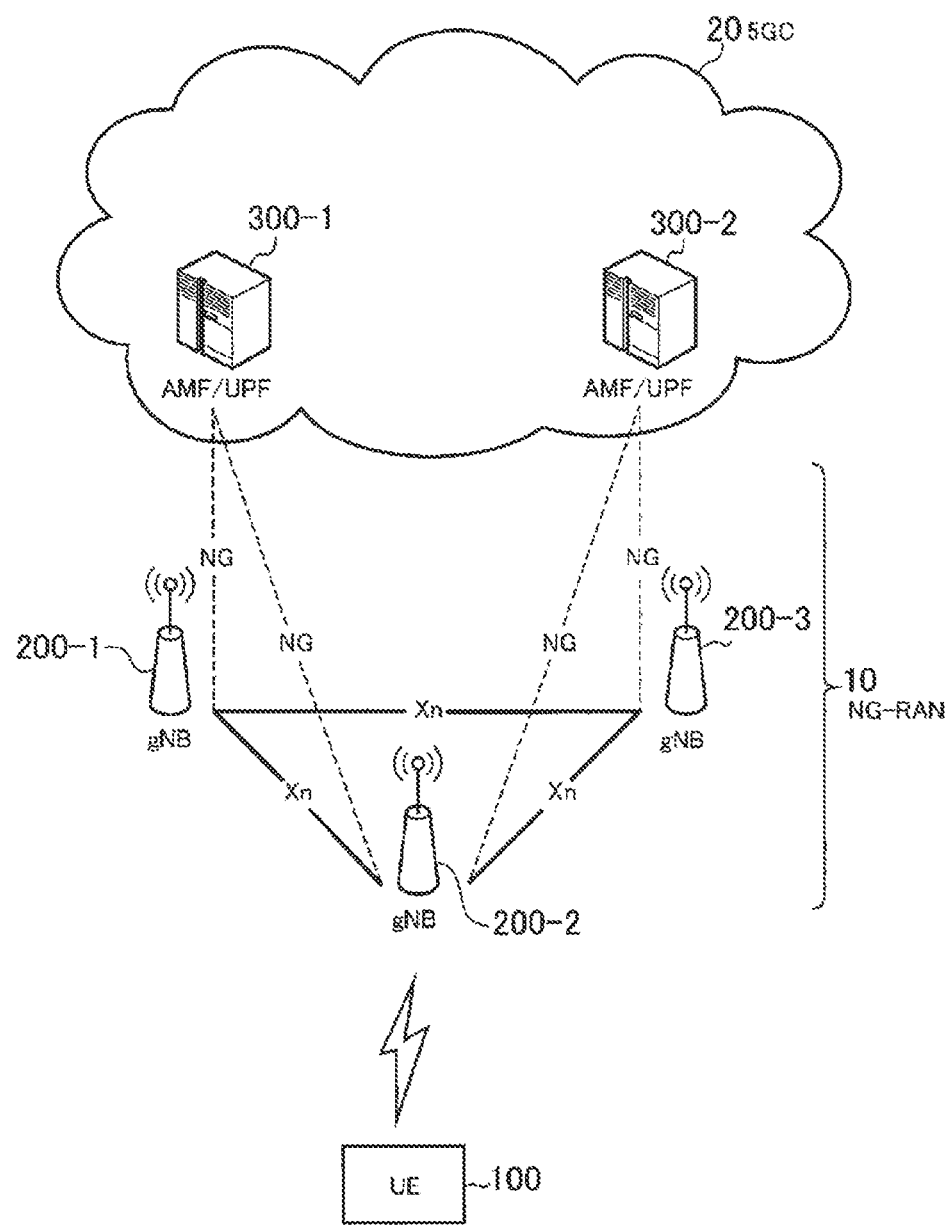
FIG. 1 is a diagram illustrating a configuration of a mobile communication system according to an embodiment.

A mobile communication system according to an embodiment will be described with reference to the drawings. In the description of the drawings, the same or similar parts are given the same or similar reference numerals.

Mobile Communication System

First, a configuration of a mobile communication system according to an embodiment will be described. Although the mobile communication system according to the embodiment is a 5G system of the 3GPP, LTE may be at least partially applied to the mobile communication system.

FIG. 1 is a diagram illustrating a configuration of the mobile communication system according to an embodiment.

As illustrated in FIG. 1, the mobile communication system includes a user equipment (UE) 100, a 5G radio access network (next-generation radio access network (NG-RAN)) 10, and a 5G core network (5GC) 20.

The UE 100 is a mobile apparatus. The UE 100 may be any apparatus as long as the UE is used by a user. Examples of the UE 100 include a mobile phone terminal (including a smartphone) or a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs radio communication with the UE 100 that has established a connection with its own cell. The gNB 200 has a radio resource management (RRM) function, a function of routing user data (hereinafter simply referred to as "data"), and/or a measurement control function for mobility control and scheduling. A "cell" is used as a term to indicate a minimum unit of a radio communication area. A "cell" is also used as a term to indicate a function or a resource for performing radio communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

The 5GC 20 includes an access and mobility management function (AMF) and a user plane function (UPF) 300. The AMF performs various kinds of mobility control and the like for the UE 100. The AMF manages information of the area in which the UE 100 exists by communicating with the UE 100 by using non-access stratum (NAS) signaling. The UPF controls data transfer. The AMF and UPF are connected to the gNB 200 via an NG interface which is an interface between a base station and the core network.

Figure 2:
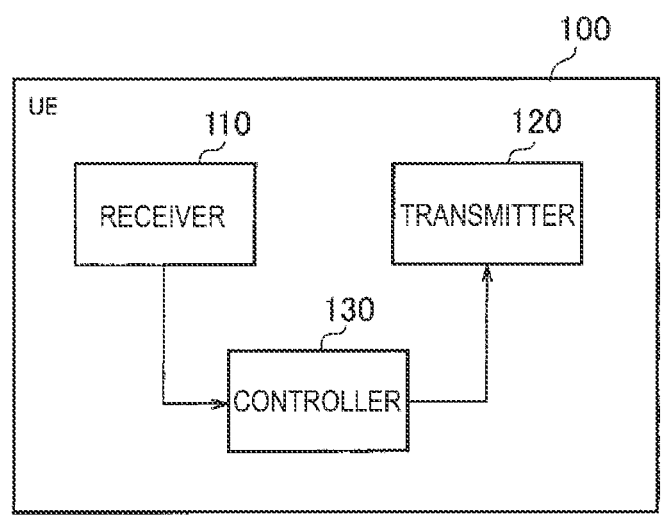
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs modulation and demodulation, and coding and decoding of a baseband signal, and the like. The CPU executes the programs stored in the memory to perform various kinds of processes.

Figure 3:
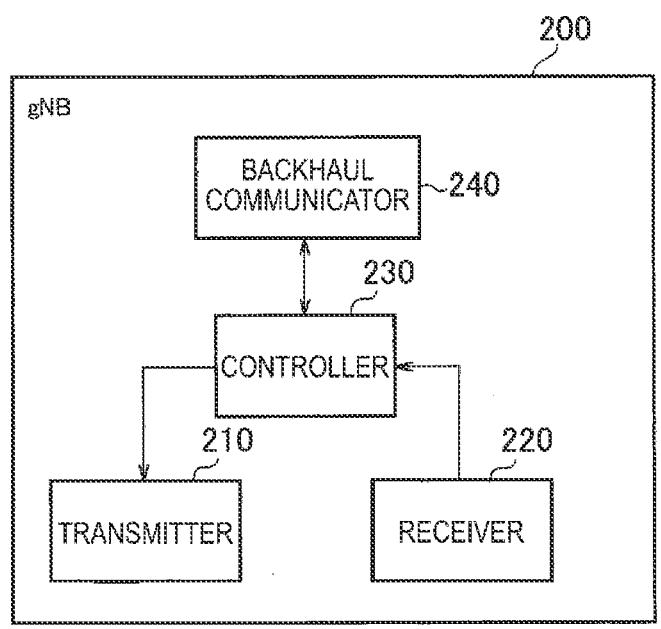
FIG. 3 is a diagram illustrating a configuration of a base station according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various kinds of controls for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various kinds of processes.

The backhaul communicator 240 is connected to a neighboring base station via the inter-base station interface. The backhaul communicator 240 is connected to the AMF/UPF 300 via the interface between a base station and the core network. Note that the gNB may include a central unit (CU) and a distributed unit (DU) (i.e., functions are divided), and the two units may be connected via an F1 interface.

Figure 4:
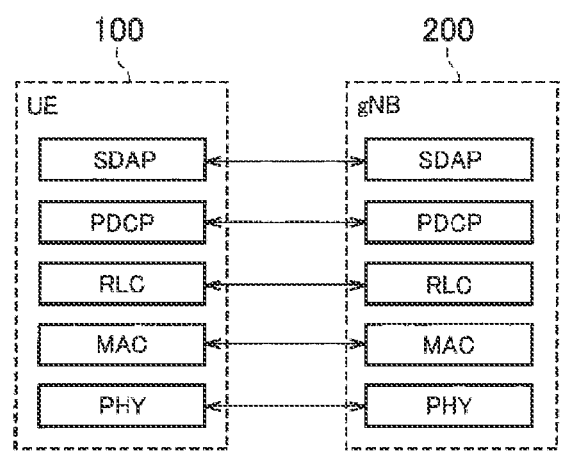
FIG. 4 is a diagram illustrating a configuration of a protocol stack of a radio interface of a user plane according to an embodiment.

FIG. 4 is a diagram illustrating a configuration of a protocol stack of a radio interface of a user plane for handling data.

As illustrated in FIG. 4, the radio interface protocol of the user plane includes a physical (PHY) layer, a medium access control (MAC) layer, and a radio link control (RLC) layer, a packet data convergence protocol (PDCP) layer, and a service data adaptation protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, retransmission processing through a hybrid ARQ (HARM), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer is to perform header compression and decompression, and encryption and decryption.

The SDAP layer performs mapping between an IP flow which is a unit of QoS control by the core network and a radio bearer which is a unit of QoS control by an access stratum (AS). Note that, when the RAN is connected to the EPC, the SDAP may not be provided.

Figure 5:
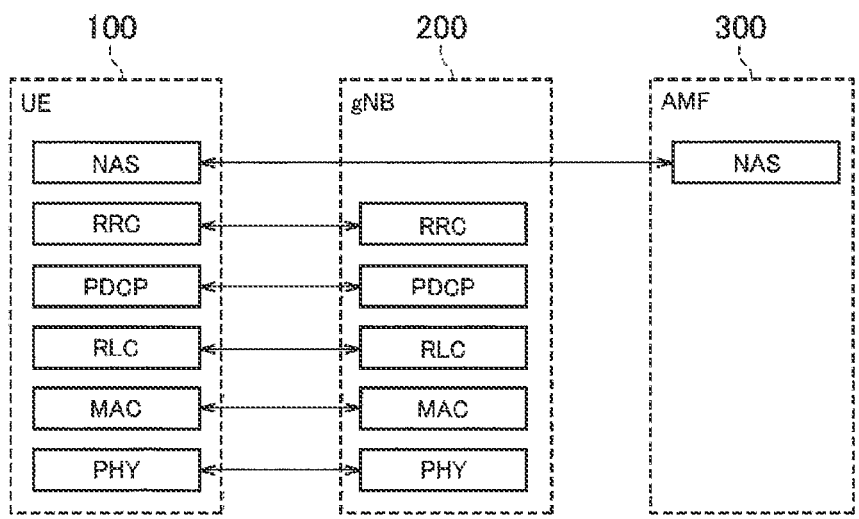
FIG. 5 is a diagram illustrating a configuration of a protocol stack of a radio interface of a control plane according to an embodiment.

FIG. 5 is a diagram illustrating a configuration of a protocol stack of a radio interface of a control plane handling signaling (control signals).

As illustrated in FIG. 5, the protocol stack of the radio interface of the control plane has a radio resource control (RRC) layer and a non-access stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. When there is a connection between the RRC of the UE 100 and the RRC of the gNB 200 (RRC connection), the UE 100 is in an RRC connected state. When there is no connection between the RRC of the UE 100 and the RRC of the gNB 200 (RRC connection), the UE 100 is in an RRC idle state. Furthermore, when the RRC connection is interrupted (suspended), the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

NR-U

Each of the embodiments to be described below is based on the assumption of NR-U using an unlicensed band in NR communication. The NR-U may use the unlicensed band alone without using both the unlicensed band and the licensed band.

In an unlicensed band, disturbing waves (interference waves) from other systems such as wireless LANs may be present, and a communication apparatus (the UE 100 or gNB 200) of the mobile communication system may interfere with other systems. A disturbing wave is a radio signal other than a desired wave. A desired wave is a radio signal (downlink signal) of which a transmission timing is known in advance, such as a synchronization signal and a PBCH block (SSB), a master information block (MIB), a system information block type 1 (SIB1), and/or a radio link monitoring reference signal (RLM-RS).

Thus, in the unlicensed band, the communication apparatuses (the UE 100 and gNB 200) are required to apply Listen-Before-Talk (LBT) before performing transmission.

When LBT is applied, the UE 100 and the gNB 200 measure and monitor disturbing wave power of a channel to determine whether a disturbing wave is present, that is, whether the channel is empty or in use (busy).

In a case where it is determined that no disturbing wave is present, that is, the channel is empty, the communication apparatuses can perform transmission. On the other hand, in a case where it is determined that a disturbing wave is present, i.e., the channel is in use, the communication apparatuses are not able to perform transmission. LBT is considered to be successful if it is determined that no disturbing wave is present. LBT is considered to have failed if it is determined that a disturbing wave is present.

Cell Reselection

The UE 100 in the RRC idle state or the RRC inactive state performs cell reselection. The UE 100 measures a reception state of each of a serving cell and neighboring cells to enable a reselection process. The UE 100 already recognizes neighboring frequencies to search for and measure a neighboring frequency different from the serving frequency being a carrier frequency to which the serving cell belongs.

The UE 100 performs cell reselection based on the measurement results for each of the serving cell and the neighboring cells to determine a cell that the UE is to camp on (a serving cell).

Here, the UE 100 performs cell reselection at the same carrier frequency (intra-frequency) as the serving frequency by ranking the cells according to their reception states. Specifically, the UE 100 selects the top ranked cell.

The UE 100 performs cell reselection at a carrier frequency (inter frequency) different from the serving frequency based on the priorities of carrier frequencies. Such frequency priorities are configured, for example, by the gNB 200 for the UE 100. The UE 100 attempts to camp on the top priority frequency available to itself. Note that, for neighboring frequencies with an equal priority to that of the serving frequency, the UE 100 may perform cell reselection by ranking the cells according to the reception states.

In a typical cell reselection, the UE 100 measures the reception states of the neighboring cells when initiation conditions are satisfied and selects a cell to be used as the serving cell from among the cells satisfying selection conditions.

First, the initiation conditions are as shown below.

(A1) A frequency with a higher priority than the priority of the frequency of the current serving cell: The UE 100 always measures the quality of frequencies with high priorities.

(A2) A frequency with a priority that is equal to or lower than the priority of the frequency of the current serving cell: When the quality of the current serving cell is lower than a predetermined threshold, the UE 100 measures the quality of the frequency with the equal or lower priority.

Second, the selection conditions are as shown below.

(B1) The priority of the frequency of a neighboring cell is higher than the priority of the current serving cell: The UE 100 selects a cell satisfying the relationship of Squal>ThreshX, HighQ over a predetermined period of time (TreselectionRAT) or a cell satisfying the relationship of Srxlev>ThreshX, HighP over the predetermined period of time (TreselectionRAT). Here, Squal is a value corresponding to the reception quality of a desired wave, and Srxlev is a value corresponding to reception power of the desired wave.

(B2) The priority of the frequency of a neighboring cell is the same as the priority of the current serving cell: The UE 100 calculates a rank $R_s$ of the current serving cell and a rank $R_n$ of the neighboring cell. The UE 100 selects a cell with a rank $R_n$ higher than $R_s$ over the predetermined period of time (TreselectionRAT).

(B3) The priority of the frequency of a neighboring cell is lower than the priority of the current serving cell: The UE 100 selects a target cell from among neighboring cells in the same way as (B1) described above on the assumption that the relationship of Squal<ThreshServing, LowQ is satisfied over a predetermined period of time (TreselectionRAT) or the relationship of Srxlev<ThreshServing, LowP is satisfied over the predetermined period of time (TreselectionRAT).

In the NR-U, the UE 100 in the RRC idle state or the RRC inactive state may select the cell to be operated in an unlicensed band in the cell reselection process. It is desirable for the UE 100 to select a cell in which no disturbing waves are present, particularly, a cell that is not congested, in the cell reselection process.

First Embodiment

A cell reselection control method according to a first embodiment is a method performed by the UE 100 in the RRC idle state or the RRC inactive state in an unlicensed band.

In the first embodiment, the UE 100 determines the congestion level for each of a plurality of candidates that are a plurality of carrier frequencies belonging to an unlicensed band or a plurality of cells. A "congestion level" is an index indicating to what extent a determination target (a carrier frequency or a cell) is being used. The UE 100 may determine a congestion level based on the reception power of a disturbing wave in the determination target.

The UE 100 may determine a congestion level based on the results of LBT check for the determination target (a carrier frequency or a cell). For example, the UE 100 measures the reception power of a disturbing wave in the determination target, compares the measurement result with a threshold, and determines that no disturbing wave is present (i.e., LBT is successful) if the measurement result is below a threshold. On the other hand, if the measurement result is equal to or greater than the threshold, it is determined that a disturbing wave is present (i.e., LBT has failed). Then, the UE 100 may determine that the determination target is congested 1) if LBT has failed, 2) if LBT has failed N times (N≥2) or more, and 3) if the ratio of the number of times of LBT check failure is equal to or greater than a threshold.

The method for determining a congestion level may be based on a channel occupancy rate (Channel occupancy) of the determination target (a carrier frequency or a cell). A "channel occupancy rate" is a ratio of received signal strength indicator (RSSI) sample values exceeding a threshold in a plurality of RSSI sample values measured in a certain period of time. These certain period of time and threshold may be configured by the gNB 200 for the UE 100. In addition, the gNB 200 may configure a timing at which RSSI measurement is to be performed for the UE 100. Then, if the channel occupancy rate exceeds the threshold, the UE 100 may determine that the determination target is congested.

A method for determining a congestion level may be based on a reception state of a desired wave in the determination target (a carrier frequency or a cell). For example, the UE 100 may determine that the determination target is congested if a desired wave cannot be detected in the determination target for a predetermined period of time.

The UE 100 extracts, from among a plurality of candidates (a plurality of carrier frequencies or a plurality of cells), candidates satisfying a selection criterion required for the candidates to be used as a serving cell of the UE 100 based on the determination result of the congestion level. Such a selection criterion may be called S-criterion. The UE 100 selects, from among the candidates satisfying the selection criterion, a cell on which the UE is to camp.

Here, the general selection criterion (S-criterion) is based on the reception power of a desired wave (and the reception quality of the desired wave). The desired wave may be, for example, a radio link monitoring reference signal (RLM-RS) transmitted from the gNB 200, or may be a synchronization signal and PBCH block (SSB) transmitted from the gNB 200. The UE 100 recognizes in advance the time and frequency resources at which the desired wave is transmitted, the signal sequence of the desired wave, and the like.

In the first embodiment, a congestion level is considered as a selection criterion in addition to the reception power (and reception quality) of a desired wave. Specifically, the UE 100 extracts a carrier frequency that is not congested or a cell that is not congested as a target on which the UE is to camp. In other words, the UE 100 excludes congested carrier frequencies or congested cells from the carrier frequency or cell candidates on which the UE is to camp.

FIG. 6 is a diagram indicating a specific example of a selection criterion according to the first embodiment. Although a selection criterion for a cell (Cell Selection Criterion) is exemplified in the first embodiment to be described below, the cell may be read as a carrier frequency. In addition, an example in which a channel occupancy rate is used as a congestion level is described.

As shown in FIG. 6, the selection criterion for a cell (cell selection criterion) is that a value corresponding to a congestion level of a cell (Soccup) is greater than a first threshold (Th), a value corresponding to reception power of the cell (Srxlev) is greater than a second threshold (0), and a value corresponding to a reception quality of the cell (Squal) is greater than a third threshold (0).

Here, the condition A that a value corresponding to a congestion level of a cell (Soccup) is greater than the first threshold (Th) is a condition that is not included in the general selection criterion for a cell. The condition A that a value corresponding to a congestion level of a cell (Soccup) is greater than the first threshold (Th) may be a condition that is applied only in an unlicensed band. The first threshold (Th) may be a fixed value configured in advance for the UE 100 or may be a variable value configured by the gNB 200 for the UE 100. The first threshold (Th) may be a positive value. The first threshold (Th) may be zero.

Specifically, in FIG. 6, Srxlev represents reception power of a cell for a desired wave. Srxlev is calculated using Srxlev=$Q_{rxlevmeas}-(Q_{rxlevmin}+Q_{rxlevminoffset})-P_{compensation}-Qoffset_{temp}$. $Q_{rxlevmeas}$ is reception power of the cell for a desired wave as a value measured by the UE 100. $Q_{rxlevmin}$ is a minimum required reception power. $Q_{rxlevminoffset}$ is a predetermined offset that is regularly applied to the cell. $P_{compensation}$ is a parameter related to an uplink capability. $Qoffset_{temp}$ is an offset that is temporarily applied to the cell.

In addition, Squal represents a quality level of a desired wave of the cell. Squal is calculated using Squal=$Q_{qualmeas}-(Q_{qualmin}+Q_{qualminoffset})-Qoffset_{temp}$. $Q_{qualmeas}$ is the quality level of the desired wave of the cell as a value measured by the UE 100. The quality level of the desired wave is a desired wave to disturbing wave ratio (Signal to Interference plus Noise power Ratio:SINR). $Q_{qualmin}$ is a minimum required quality level. $Q_{qualminoffset}$ is a predetermined offset that is regularly applied to the cell. $Qoffset_{temp}$ is an offset that is temporarily applied to the cell.

In addition, Soccup represents a congestion level of the cell. Soccup is calculated according to a formula (Qoccup_max+Qoccup_offset)−(Qoccup_meas). Qoccup_meas is a channel occupancy rate of the cell as a value measured by the UE 100. Qoccup_max is the maximum allowable channel occupancy rate. Qoccup_offset is a predetermined offset that is applied to the cell.

Note that parameters such as various offsets used in selecting a cell are included in information (System Information Block: SIB) broadcast from the gNB 200.

The UE 100 selects a cell to be used as a serving cell (i.e., a cell on which the UE 100 is to camp) from among cells satisfying the cell selection criterion. Here, the UE 100 performs ranking based on a reception state at a carrier frequency (intra-frequency) identical to a serving frequency to which the current serving cell belongs, and other carrier frequencies (inter frequencies) having the same priority as the serving frequency. Then, the UE 100 selects the top ranked cell as a cell to be used as a serving cell (a cell to camp on).

The general ranking criterion (R-criterion) is based on reception power for a desired wave. As the reception power for a desired wave is greater, the cell is ranked higher. In the first embodiment, a congestion level is considered as a ranking criterion in addition to the reception power for a desired wave. Specifically, the UE 100 adjusts a cell that is not congested to be ranked higher. In other words, the UE 100 adjusts a cell that is congested to be ranked lower.

FIG. 7 is a diagram indicating a specific example of the ranking criterion according to the first embodiment. FIG. 7 shows an example in which a channel occupancy rate is used as a congestion level.

As shown in FIG. 7, $R_s$ that is the ranking criterion for the current serving cell is calculated according to a formula $R_s = Q_{meas, s} + Q_{hyst} - Qoffset_{temp} - Qmeas, congestion$. $Q_{meas, s}$ is reception power of the current serving cell for a desired wave as a value measured by the UE 100. $Q_{hyst}$ and $Qoffset_{temp}$ are predetermined offsets that are applied to the current serving cell. Qmeas, congestion is an offset value corresponding to a channel occupancy rate (congestion level) of the current serving cell as a value measured by the UE 100. Qmeas, congestion may be included in the information (SIB) broadcast from the gNB 200. A mapping table for congestion levels measured by the UE 100 and Qmeas, congestion may be included in the SIB.

Thus, as the congestion level of the current serving cell becomes higher, the rank $R_s$ of the current serving cell is adjusted to be lower.

In addition, $R_n$ that is a ranking criterion for neighboring cells is calculated using $R_n = Q_{meas, n} + Q_{offset} - Qoffset_{temp} - Qmeas, congestion$. $Q_{meas, n}$ is reception power of a neighboring cell for a desired wave as a value measured by the UE 100. $Q_{offset}$ and $Qoffset_{temp}$ are predetermined offsets that are applied to the neighboring cell. Qmeas, congestion is an offset value corresponding to a channel occupancy rate (congestion level) of the neighboring cell as a value measured by the UE 100. Qmeas, congestion may be included in the information (SIB) broadcast from the gNB 200. A mapping table for congestion levels measured by the UE 100 and Qmeas, congestion may be included in the SIB.

Thus, as the congestion level of the neighboring cell becomes higher, the rank $R_n$ of the neighboring cell is adjusted to be lower.

Note that parameters such as various offsets used in the ranking are included in the information (SIB) broadcast from the gNB 200.

Figure 8:
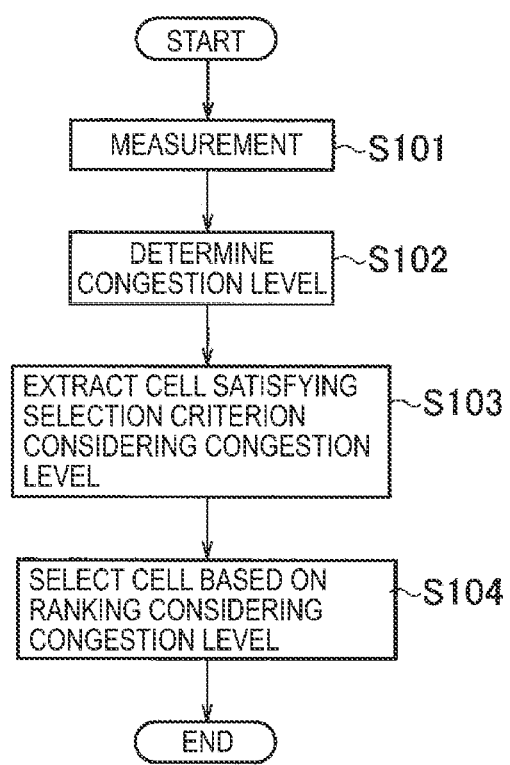
FIG. 8 is a diagram illustrating a cell reselection control method according to the first embodiment.

FIG. 8 is a diagram illustrating the cell reselection control method according to the first embodiment.

As illustrated in FIG. 8, the UE 100 performs various kinds of measurements in step S101. For example, the UE 100 measures reception power and/or a reception quality for a desired wave and/or reception power of a disturbing wave for each of the current serving cell and neighboring cells. The neighboring cells may be neighboring cells belonging to the intra-frequency or neighboring cells belonging to the inter-frequency.

In step S102, the UE 100 determines the congestion level for each of the current serving cell and the neighboring cells at least based on the reception power of the disturbing wave measured in step S101.

In step S103, the UE 100 extracts neighboring cells satisfying the cell selection criterion (S-criterion), taking the congestion level determined in step S102 into consideration.

In step S104, the UE 100 ranks each of the current serving cells and the neighboring cells and selects the cell ranked at the top based on the ranking criterion (R-criterion) as the cell on which the UE 100 is to camp, taking the congestion level determined in step S102 into consideration.

Although the congestion level is considered in both steps S103 and S104 here, the congestion level may be considered in only one of steps S103 and S104.

Modified Example of First Embodiment

In the above-described embodiment, an example in which the determination conditions based on a congestion level of a cell and an offset value indicating the congestion level of the cell are newly introduced to the cell selection criterion (S-criterion) and the ranking criterion (R-criterion) is described.

However, instead of introducing a new determination criterion or a new offset value to the cell selection criterion (S-criterion) and the ranking criterion (R-criterion), an existing determination criterion and offset value may be adjusted based on a congestion level of a cell.

For example, in the cell selection criterion (S-criterion) indicated in FIG. 6, any of the offset values ($Q_{rxlevmin}$, $Q_{rxlevminoffset}$, $P_{compensation}$, and $Qoffset_{temp}$) included in the calculation formula of Srxlev that are values corresponding to the reception power for a desired wave may be adjusted (scaled) in accordance with a congestion level of the corresponding cell. Any of the offset values ($Q_{qualmin}$, $Q_{qualmmoffset}$, and $Qoffset_{temp}$) included in the calculation formula of Squal that are values corresponding to the reception quality of a desired wave may be adjusted (scaled) in accordance with a congestion level of the corresponding cell.

In addition, in the ranking criterion (R-criterion) indicated in FIG. 7, any of the offset values ($Q_{hyst}$ and $Qoffset_{temp}$) included in the calculation formula of the ranking criterion $R_s$ for the current serving cell may be adjusted (scaled) in accordance with a congestion level of the current serving cell. Any of the offset values ($Q_{offset}$ and $Qoffset_{temp}$) included in the calculation formula of the ranking criterion $R_n$ for a neighboring cell may be adjusted (scaled) in accordance with a congestion level of the neighboring cell.

FIG. 9 is a diagram indicating a cell reselection control method according to a modified example of the first embodiment.

As illustrated in FIG. 9, the UE 100 classifies cells according to their congestion levels. For example, the congestion level of each of the cells is compared to thresholds (Thresh_congestion_H, Thresh_congestion_L), and if the state of the congestion level continues for a predetermined period of time (T_congestion), the state of the congestion level is classified as one of a high congestion level (High), an intermediate congestion level (Mid), and a low congestion level (Normal). These thresholds (Thresh_congestion_H and Thresh_congestion_L) and the predetermined period of time (T_congestion) may be included in the SIB broadcast from the gNB 200.

Then, the offset values are adjusted (scaled) as described above in accordance with the classified state of the congestion level. For example, if $Q_{hyst}$ included in the calculation formula of the ranking criterion $R_s$ of the current serving cell is to be adjusted, it is adjusted (scaled) to $Q_{hyst} = Q_{hyst} \times$ scaling factor (High congestion). Note that the UE 100 may not perform scaling for a low congestion level (Normal). In addition, the scaling factor may be included in the information broadcast from the gNB 200.

Although an example in which the offset values included in the cell selection criterion (S-criterion) and the ranking criterion (R-criterion) are scaled has been described here, the above-described TreselectionRAT may be scaled in accordance with a congestion level.

Second Embodiment

A second embodiment will be described while focusing on differences from the above-described first embodiment.

In the second embodiment, a frequency priority (absolute priority) which is a priority for each carrier frequency in cell reselection is considered. A frequency priority is configured from the gNB 200 for the UE 100 through broadcast signaling (SIB) or unicast signaling (UE-dedicated signaling). Specifically, the frequency priority is provided in combination with an identifier of the carrier frequency and is configured in the form of list including a plurality of such combinations.

Here, a frequency priority configured through unicast signaling may be referred to as a UE-dedicated priority. The UE-dedicated priority is included in an RRC release message transmitted from the gNB 200 to the UE 100 in an RRC connected state. The RRC release message is a message for releasing or interrupting an RRC connection. The UE 100 transitions to the RRC idle state or the RRC inactive state in response to the reception of an RRC release message.

A common UE-dedicated priority is applied when the UE 100 transitions to the RRC idle state or the RRC inactive state. In other words, the UE 100 immediately applies the UE-dedicated priority included in the RRC release message, and performs cell reselection based on the UE-dedicated priority.

However, in an unlicensed band, it is difficult for the gNB 200 to predict the occurrence of disturbing waves in the future, and the radio state in the unlicensed band changes from time to time. Thus, after the gNB 200 configures a UE-dedicated priority for the UE 100, the configured UE-dedicated priority may be inappropriate as time elapses.

In the second embodiment, a new UE-dedicated priority called a conditional priority is introduced. When the UE 100 transitions to the RRC idle state or the RRC inactive state, instead of immediately applying a conditional priority, the application of the conditional priority is suspended until a predetermined condition for the current serving cell is satisfied. Then, if the predetermined condition is satisfied, the UE 100 applies the conditional priority. As a result, after the conditional priority (UE-dedicated priority) is configured, the UE 100 can apply the conditional priority (UE-dedicated priority) at a proper timing.

Figure 10:
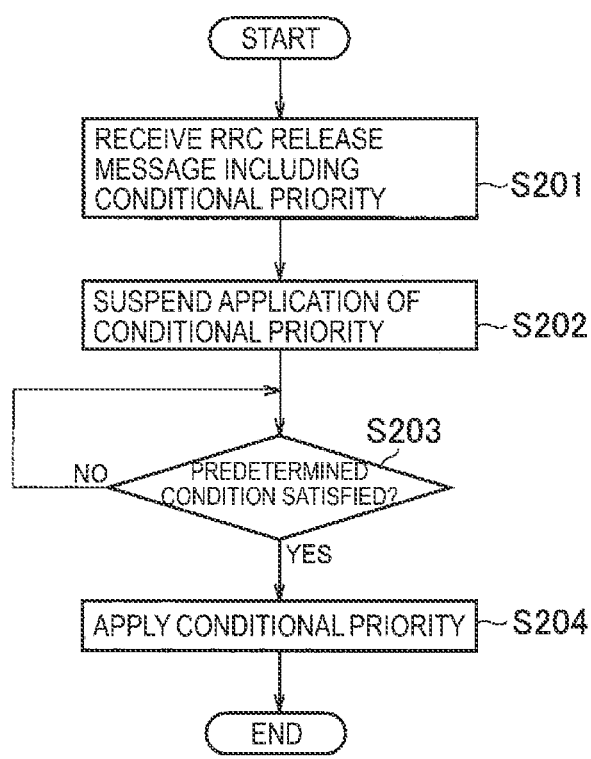
FIG. 10 is a diagram illustrating a cell reselection control method according to a second embodiment.

FIG. 10 is a diagram illustrating a cell reselection control method according to the second embodiment.

As illustrated in FIG. 10, the UE 100 in an RRC connected state receives an RRC release message from the gNB 200 in step S201 and transitions to the RRC idle state or the RRC inactive state.

The RRC release message includes a conditional priority for determining a priority of each carrier frequency in cell reselection.

The RRC release message may further include, in addition to the conditional priority, a common frequency priority to determine a priority in cell reselection for each carrier frequency. A common frequency priority is a UE-dedicated priority that the UE 100 should apply immediately. In the following, the common frequency priority is referred to as a non-conditional priority (Non-conditional dedicated priority).

The RRC release message may include configuration information for specifying an application condition (predetermined condition) for a conditional priority (Conditional dedicated priority) for the UE 100.

Here, the predetermined condition may include at least one of a conditions A1 that a congestion level of the current serving cell has increased or a condition A2 that a reception state of the current serving cell for a desired wave has degraded. For example, the predetermined condition may be a condition that a congestion level of the serving cell exceeds a threshold, or a condition that the UE 100 has determined that the serving cell is congested.

The predetermined condition may include a condition B that transition from the RRC idle state or the RRC inactive state to the RRC connected state needs to be performed. For example, the predetermined condition may be a time when an RRC connection is to be established, resumed, or re-established (when any of PRACH transmission, RRC request transmission, RRC resume request transmission, and RRC reestablishment request transmission needs to be performed).

The predetermined condition may be a combination of at least one of the condition A1 or the condition A2 and the condition B. For example, the UE 100 performs cell reselection by applying a conditional priority if the condition for a "congestion level" is satisfied prior to PRACH transmission.

The RRC release message may include a value of a first timer for determining a period during which the conditional priority (conditional dedicated priority) can be applied. The UE 100 starts the first timer when the RRC release message is received, and disables (discards) the configuration of the conditional priority when the first timer expires. The UE 100 stops the first timer when the conditional priority is applied during an operation of the first timer.

The RRC release message may include a value of a second timer for determining a period during which a conditional priority (Conditional dedicated priority) can be continuously applied. The UE 100 starts the second timer when the conditional priority is applied, and disables (discards) the configuring of the conditional priority when the second timer expires.

Note that, in a case where the setting of the conditional priority is disabled (discarded), the UE 100 may apply the frequency priority notified by the SIB to the cell reselection.

The RRC release message may include a value of a third timer for determining a period in which a non-conditional priority (non-conditional dedicated priority) can be continuously applied. The UE 100 starts the third timer when the RRC release message is received, and disables (discards) the configuration of the conditional priority when the third timer expires.

In step S202, the UE 100 that has transitioned to the RRC idle state or the RRC inactive state in response to the reception of the RRC release message suspends, instead of immediately applying a conditional priority, the application of the conditional priority until the predetermined condition for the current serving cell is satisfied.

Here, when the UE 100 transitions to the RRC idle state or the RRC inactive state, the UE 100 may apply a non-conditional priority to the cell reselection.

In addition, when the UE 100 transitions to the RRC idle state or the RRC inactive state, the UE 100 may start the first timer and the third timer.

In step S203, the UE 100 checks whether the predetermined condition specified in the RRC release message is satisfied. If the predetermined condition is satisfied (step S203: YES), the UE 100 allows the process to proceed to step S204.

In step S204, the UE 100 applies the conditional priority to cell reselection.

Here, the UE 100 may start the second timer.

In addition, in response to the satisfied predetermined condition, the UE 100 may start application of the conditional priority by overwriting the non-conditional priority that has been applied until then with the conditional priority. Here, the UE 100 may discard the non-conditional priority or may retain the non-conditional priority. When the non-conditional priority is maintained, the UE 100 may terminate the application of the conditional priority when the second timer expires and restart application of the conditional priority.

The UE 100 may configure the priority of the current serving cell or the priority of the carrier frequency to which the current serving cell belongs to the lowest priority as the priority in cell reselection in response to the satisfied predetermined condition. This may facilitate cell reselection for a neighboring cell or a neighboring frequency.

Note that, in the present operation flow, a case in which the UE 100 performs cell reselection for a neighboring cell before the predetermined condition for the current serving cell (i.e., the cell at the time of the reception of the RRC release message) is satisfied is not particularly considered.

However, if the UE 100 performs cell reselection for a neighboring cell before a predetermined condition is satisfied, the UE 100 may discard the configuration of the conditional priority or may retain the configuration of the conditional priority. If the configuration of the conditional priority is maintained, the current serving cell after cell reselection is the cell as a cell reselection target, and the predetermined condition will be a condition for the cell as a cell reselection target.

Modified Example 1 of First and Second Embodiments

Modified Example 1 of the first and second embodiments will be described while focusing on differences from the first and second embodiments.

Generally, in an unlicensed band, determination (LBT check) of whether a disturbing wave is present is performed when transmission data is generated. Specifically, in a case where data transmitted to a second communication apparatus from a first communication apparatus existing in a cell operated in an unlicensed band is generated, the physical layer of the first communication apparatus performs LBT check by measuring the disturbing wave power of the unlicensed band. However, in the NR-U, it is desirable to be able to perform LBT check even in a case where no transmission data is generated.

Figure 11:
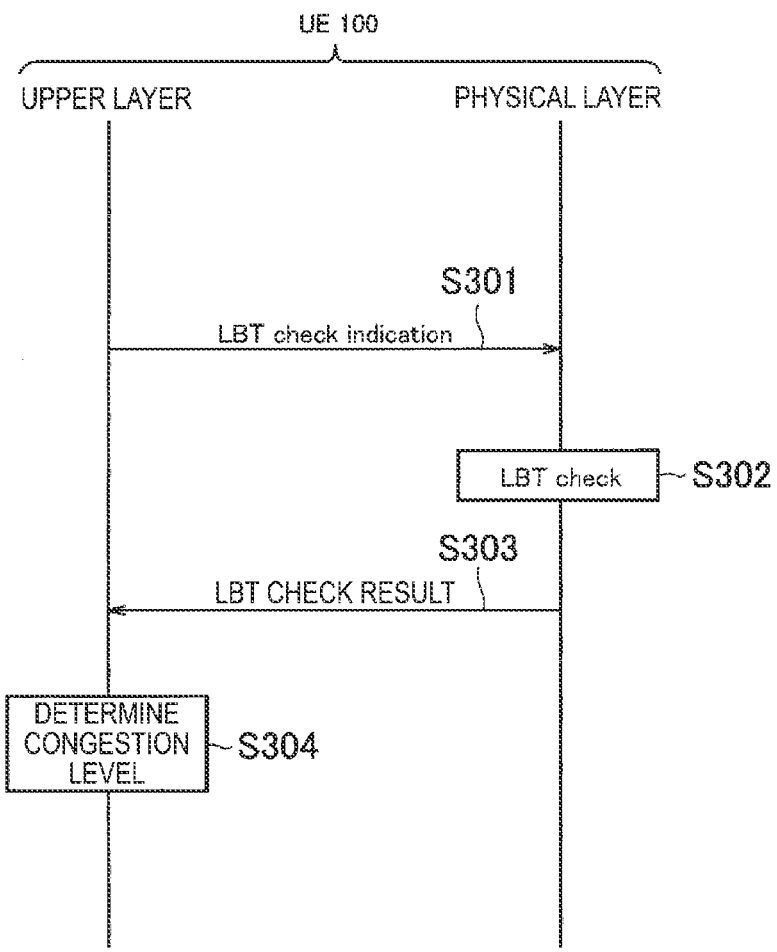
FIG. 11 is a diagram illustrating Modified Example 1 of the first and second embodiments.

FIG. 11 is a diagram illustrating Modified Example 1 of the first and second embodiments. Here, although an operation of the UE 100 will be described as an example, the operation of FIG. 11 may be performed by the gNB 200. Note that, although it is assumed that the UE 100 is in the RRC idle state or the RRC inactive state in a cell operated in the unlicensed band, the UE 100 may be in the RRC connected state.

As illustrated in FIG. 11, in step S301, the upper layer of the UE 100 instructs the physical layer of the UE 100 to perform LBT check even in a case where data to be transmitted from the UE 100 (a first communication apparatus) to another communication apparatus (a second communication apparatus) is not generated. A specific example of a trigger for such an instruction is also described in Modified Example 3. Here, the upper layer may be an MAC layer or an RRC layer.

For example, the upper layer notifies the physical layer of an LBT check indication for instructing performance of LBT check. The upper layer may notify the physical layer of how many times physical layers should perform LBT check (e.g., N times (N≥1)).

In addition, the upper layer may notify the physical layer of a carrier frequency or a channel for which an LBT check is to be performed. The LBT check may be performed for a serving frequency that is a carrier frequency of a serving cell, a band (channel) of a portion of the serving frequency, a neighboring frequency different from the serving frequency (specifically, a neighboring frequency belonging to an unlicensed band), and/or a band (channel) of a portion of the neighboring frequency.

In step S302, the physical layer of the UE 100 performs LBT check in response to the instruction from the upper layer. The physical layer may perform LBT check for the number of times notified of from the upper layer.

In step S303, the physical layer of the UE 100 notifies the upper layer of the result of the LBT check of step S302. For example, the physical layer notifies the upper layer of the fact that LBT was successful or LBT was failed. The physical layer may notify the upper layer of the results of a plurality of times of the LBT check (e.g., M successes, or L failures (M, L≥0)). The physical layer may notify the upper layer of the number of times LBT check was performed and the number of successes, and may not notify the upper layer of the number of failures. The physical layer may notify the upper layer of the number of times the LBT check was performed and the number of failures, and may not notify the upper layer of the number of successes.

In step S304, the upper layer of the UE 100 determines (determines) the congestion level of the unlicensed band based on the notification from the physical layer. For example, in a case where LBT check was failed, LBT check was failed N times (N≥2) or more, and the ratio of the LBT check failure is equal to or greater than a threshold, the upper layer may determine that the carrier frequency or the channel for which the LBT check is to be performed is congested.

According to Modified Example 1, LBT check can be performed even when transmission data is not generated due to interlayer coordination between the physical layer and the upper layer.

Modified Example 2 of First and Second Embodiments

Modified Example 2 of the first and second embodiments will be described while focusing on differences from the first and second embodiments.

As described above, in the cell reselection process, a frequency priority is configured by the gNB 200 for the UE 100, and the UE 100 performs a cell reselection process in consideration of frequency priorities. For example, the UE 100 performs measurement on a neighboring frequency (measurement of reception power for a desired wave) at all times when there is a neighboring frequency having a priority higher than the priority configured as a carrier frequency of a current serving cell. Such measurement is referred to as inter-frequency measurement.

However, in a case where a neighboring frequency with a high priority is congested in NR-U, it is not preferable to reselect a cell belonging to this neighboring frequency, and thus it is desirable not to perform measurement on this neighboring frequency. This allows the power of the UE 100 consumed due to the measurement to be saved.

In Modified Example 2, the UE 100 in the RRC idle state or the RRC inactive state determines a congestion level for a high priority frequency by measuring disturbing wave power for the high priority frequency having a priority higher than a priority configured for the carrier frequency of the current serving cell. A method for determining the congestion level is similar to those in the first and second embodiments described above.

Then, if the UE 100 determines that the high priority frequency is congested, the UE 100 skips measurement for the high priority frequency for a certain period of time. Here, the value of a timer that defines the certain period of time may be configured using SIB or dedicated RRC signaling from the gNB 200 to the UE 100.

For example, if the UE 100 determines that the high priority frequency is congested, the UE 100 may skip determination of congestion level (i.e., measurement of disturbing wave power) for a certain period of time, or skip inter-frequency measurement (i.e., measurement of desired wave power) for the high priority frequency.

If the UE 100 determines that the high priority frequency is congested, the UE 100 may suppress measurement by lowering the priority configured to the high priority frequency (e.g., assuming the priority as a lowest priority) for a certain period of time.

Figure 12:
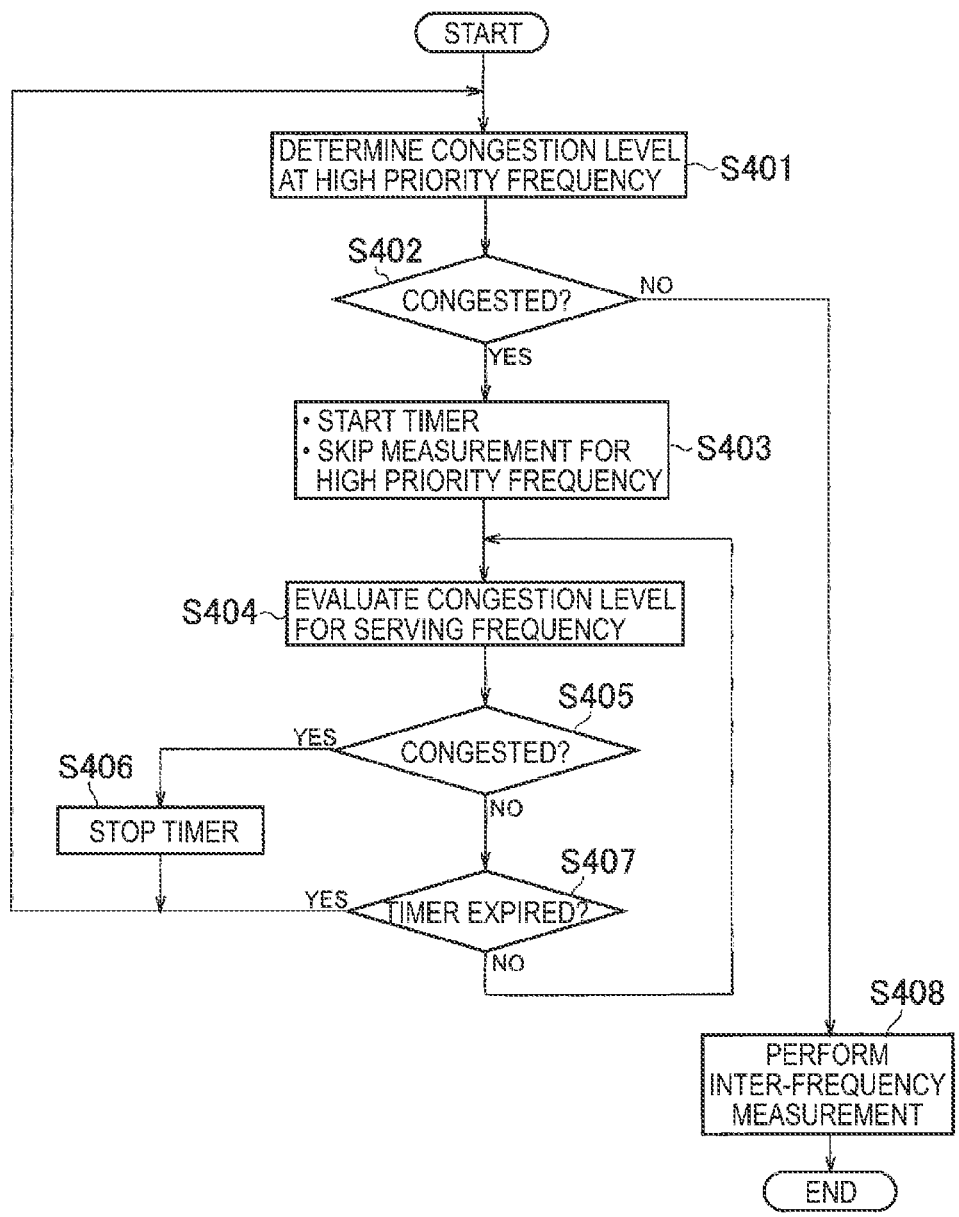
FIG. 12 is a diagram illustrating Modified Example 2 of the first and second embodiments.

FIG. 12 is a diagram illustrating Modified Example 2 of the first and second embodiments. In this operation, the UE 100 is assumed to be in the RRC idle state or the RRC inactive state in a cell operated in an unlicensed band.

As illustrated in FIG. 12, the UE 100 determines a congestion level by measuring disturbing wave power at the high priority frequency in step S401.

If it is determined that the high priority frequency is congested (step S402: YES), the UE 100 starts the timer and skips measuring the high priority frequency in step S403. The UE 100 continues to skip measurement for the high priority frequency while the timer is running.

In step S404, the UE 100 determines the congestion level by measuring the disturbing wave power for the serving frequency.

If the serving frequency is determined to be congested (step S405: YES), the UE 100 stops the timer and returns the process to step S401 in step S406.

On the other hand, if it is determined that the serving frequency is not congested (step S405: NO), the UE 100 checks whether the timer has expired in step S407. If the timer has expired (step S407: YES), the UE 100 returns the process to step S401. If the timer has not expired (step S407: NO), the UE 100 returns the process to step S404.

According to Modification Example 2, in a case where a neighboring frequency with a high priority is congested, the measurement on the neighboring frequency is not performed, thus saving the power consumption of the UE 100.

Modified Example 3 of First and Second Embodiments

Modified Example 3 of the first and second embodiments will be described while focusing on differences from the first and second embodiments.

Because the above-described determination of congestion level (in particular, measuring of a channel occupancy rate) requires large power consumption of the UE 100, it is desirable to reduce the duration of time and the number of times of determination of congestion level as much as possible.

Figure 13:
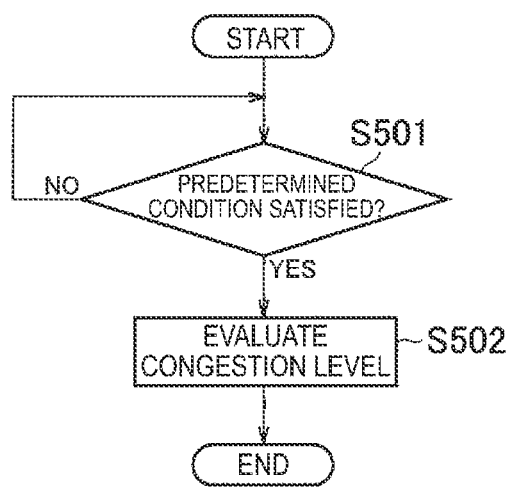
FIG. 13 is a diagram illustrating Modified Example 3 of the first and second embodiments.

FIG. 13 is a diagram illustrating Modified Example 3 of the first and second embodiments. In this operation, the UE 100 is assumed to be in the RRC idle state or the RRC inactive state in a cell operated in an unlicensed band.

As illustrated in FIG. 13, the UE 100 determines the congestion level by measuring the disturbing wave power i the unlicensed band in step S502 as long as the predetermined condition is satisfied (step S501).

Here, although the determination of congestion level is basically based on the assumption of a determination of congestion level of the current serving cell (serving frequency), it may also be applied to neighboring cells (neighboring frequencies). For example, the UE 100 may determine the congestion level of a neighboring cell (a neighboring frequency) if the current serving cell (the serving frequency) is congested. The UE 100 may determine the congestion level of a neighboring cell (a neighboring frequency) if the priority configured for the current serving cell (serving frequency) is not the highest priority or is not ranked at the top (i.e., the reception power of desired wave is the highest). Such operations may be applied in the embodiments described above as well.

The predetermined condition for proceeding to a determination of congestion level may be a condition that radio signal reception power (desired wave power) received by the UE 100 from a serving cell is lower than a threshold. If the desired wave power is zero, the UE 100 may consider that the gNB 200 has failed in LBT and determine that the serving frequency is congested. If the UE 100 determines that the serving frequency is not congested, the UE may perform cell reselection for other cells with the same frequency. If the UE 100 determines that the serving frequency is congested, the UE 100 may perform inter-frequency measurement and perform cell reselection for other cells at neighboring frequencies.

The predetermined condition for proceeding to a determination of congestion level may be a condition that the UE 100 performs a tracking area update (TAU) process or a RAN-based notification area update (RNAU) process via a cell. TAU is a process of performing, by the UE 100, notification to the AMF when the UE moves from one tracking area to another tracking area. RNAU is a process of performing, by the UE 100 in the RRC connected state, notification to the gNB 200 being a movement destination when the UE moves from one RAN-based notification area to another RAN-based notification area. Here, the UE 100 may determine the congestion level for each of the serving frequency and the neighboring frequencies, and may perform transmission at a non-congested frequency among these frequencies.

The predetermined condition for proceeding to a determination of congestion level may be a condition that the UE 100 performs a connection process to the cell. The connection process may be physical random access channel (PRACH) transmission in a random access procedure or Msg3 (e.g., an RRC Request message) transmission in a random access procedure. Here, the UE 100 may determine the congestion level for each of the serving frequency and the neighboring frequencies, and may perform transmission at a non-congested frequency among these frequencies.

The predetermined condition for proceeding to a determination of congestion level may be a condition that the UE 100 performs a cell reselection process. Here, if the serving frequency is congested, the UE 100 may perform inter-frequency measurement.

Other Embodiments

Each of the embodiments described above may not only be separately and independently implemented, but also be implemented in combination of two or more embodiments.

Although the 5G system (NR) is primarily described in each of the embodiments described above, operations according to each embodiment may be applied to LTE.

Note that a program for causing a computer to execute each process performed by the UE 100 or the gNB 200 may be provided. The program may be recorded on a computer readable medium. The program can be installed in a computer by using the computer readable medium Here, the computer readable medium on which the program is recorded may be a non-transitory recording medium. Although the non-transitory recording medium is not limited to a particular one, a recording medium, for example, a CD-ROM, a DVD-ROM, or the like may be adopted.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although embodiments have been described in detail with reference to the drawings, a specific configuration is not limited to those described above, and various design modifications and the like can be made without departing from the gist.

The invention claimed is:

1. A cell reselection control method for controlling a cell reselection process in an unlicensed band, the cell reselection control method comprising:
    receiving, by a user equipment in a radio resource control (RRC) connected state, an RRC release message including a conditional priority for determining a priority in the cell reselection for a carrier frequency from a base station;
    suspending, by the user equipment that has transitioned to an RRC idle state or an RRC inactive state in accordance with the reception of the RRC release message, application of the conditional priority until a predetermined condition for a current serving cell is satisfied, instead of immediately applying the conditional priority;
    applying, by the user equipment in the RRC idle state or the RRC inactive state, the conditional priority if the predetermined condition is satisfied; and
    configuring, by the user equipment, a priority of the current serving cell or a priority of a carrier frequency to which the current serving cell belongs to a lowest priority as a priority in the cell reselection if the predetermined condition is satisfied.

2. The cell reselection control method according to claim 1,
    wherein the RRC release message includes configuration information for specifying the predetermined condition for the user equipment.

3. The cell reselection control method according to claim 1,
    wherein the predetermined condition includes at least one of a condition that a congestion level of the current serving cell has increased or a condition that a reception state of a desired wave in the current serving cell has degraded.

4. The cell reselection control method according to claim 1,
    wherein the predetermined condition includes a condition that transition from the RRC idle state or the RRC inactive state to the RRC connected state needs to be performed.

5. The cell reselection control method according to claim 1, further comprising:
    starting, by the user equipment, a first timer for determining a period during which the conditional priority can be applied when transitioning to the RRC idle state or the RRC inactive state.

6. The cell reselection control method according to claim 1, further comprising:
    starting, by the user equipment, a second timer for determining a period during which the conditional priority can be continuously applied when the conditional priority is applied.

7. The cell reselection control method according to claim 1,
    wherein the RRC release message further includes, in addition to the conditional priority, a frequency priority for determining a priority for a carrier frequency in the cell reselection, and
    the cell reselection control method further includes
    applying, by the user equipment, the frequency priority when the UE transitions to the RRC idle state or the RRC inactive state, and
    overwriting, by the user equipment, the frequency priority with the conditional priority if the predetermined condition is satisfied.

8. A user equipment configured to perform cell reselection process in an unlicensed band, the user equipment comprising a processor and a memory, the processor configured to:
    when the user equipment is in a radio resource control (RRC) connected state, receive an RRC release message including a conditional priority for determining a priority in the cell reselection for a carrier frequency from a base station;
    when the user equipment that has transitioned to an RRC idle state or an RRC inactive state in accordance with the reception of the RRC release message, suspend application of the conditional priority until a predetermined condition for a current serving cell is satisfied, instead of immediately applying the conditional priority;
    apply, the conditional priority if the predetermined condition is satisfied; and
    configure, by the user equipment, a priority of the current serving cell or a priority of a carrier frequency to which the current serving cell belongs to a lowest priority as a priority in the cell reselection if the predetermined condition is satisfied.

* * * * *